(12) United States Patent
Kang

(10) Patent No.: US 7,349,173 B1
(45) Date of Patent: Mar. 25, 2008

(54) SELF-TUNING SETTLE CONTROLLER IN HARD DISK DRIVES

(75) Inventor: Chang-Ik Kang, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/580,181

(22) Filed: Oct. 11, 2006

(51) Int. Cl.
*G11B 5/55* (2006.01)

(52) U.S. Cl. .................. 360/78.04; 369/78.09
(58) Field of Classification Search ............... None
See application file for complete search history.

(56) References Cited

U.S. PATENT DOCUMENTS

| | | | | |
|---|---|---|---|---|
| 5,459,624 A | * | 10/1995 | Erickson et al. | 360/78.04 |
| 5,805,374 A | * | 9/1998 | Kisaka | 360/78.04 |
| 5,859,743 A | * | 1/1999 | Kisaka | 360/78.04 |
| 6,046,878 A | * | 4/2000 | Liu et al. | 360/78.09 |
| 6,166,876 A | * | 12/2000 | Liu | 360/78.04 |
| 6,690,537 B2 | * | 2/2004 | Kagami et al. | 360/78.04 |
| 6,917,488 B2 | * | 7/2005 | Ozawa et al. | 360/78.04 |
| 7,203,028 B2 | * | 4/2007 | Chung et al. | 360/78.09 |

* cited by examiner

*Primary Examiner*—Hoa T. Nguyen
*Assistant Examiner*—James L Habermehl
(74) *Attorney, Agent, or Firm*—Ben J. Yorks; Irell & Manella LLP

(57) ABSTRACT

A hard disk drive with a voice coil motor controlled by a circuit. The circuit provides a driving current to the voice coil motor to move a head of the drive in a seek routine. The seek routine includes a settle mode that has an initial state and a velocity versus head position eigenvector. The eigenvector is changed to coincide with on the initial state when the seek routine enters the settle mode. Changing the eigenvector to coincide with the initial state induces a head velocity and movement with minimal overshoot or undershoot during the settle mode.

9 Claims, 4 Drawing Sheets

SELF-TUNING SETTLE CONTROLLER IN HARD DISK DRIVES

BACKGROUND OF THE INVENTION

1. Field of the Invention

The present invention relates to a seek routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A–B)–(C–D)) to create a position error signal ("PES"). The PES is used to create a drive signal for the voice coil motor to position the head on the track.

The drive will enter a seek routine to access data at different disk tracks. During a seek routine a requested address location is provided and a corresponding seek time and drive current is calculated to drive the voice coil motor and move the heads to the desired location. Before the head arrives at the desired disk location the seek routine enters a settle mode. In the settle mode the head velocity is reduced until the head reaches the desired track. The settle response time is dependent on the initial state when the seek routine enters the settle mode. The initial state includes the head velocity and the position of the head when the settle mode is initiated. The initial state can change depending on the head velocity, temperature and direction of head movement. The varying initial state can cause undesirable undershoot or overshoot settle behavior. It would be desirable to provide a scheme that compensates for changing initial states when a seek routine enters a settle mode.

BRIEF SUMMARY OF THE INVENTION

A hard disk drive with a circuit that controls a voice coil motor. The circuit provides a driving current to the voice coil motor to move a head of the drive in a seek routine. The seek routine includes a settle mode that has an initial state and a velocity versus head position eigenvector. The eigenvector is changed to coincide with the initial state when the seek routine enters the settle mode.

DETAILED DESCRIPTION

Described is a hard disk drive with a voice coil motor controlled by a circuit. The circuit provides a driving current to the voice coil motor that is used to move a head of the drive in a seek routine. The seek routine includes a settle mode that has an initial state and a velocity versus head position eigenvector. The eigenvector is changed to coincide with the initial state when the seek routine enters the settle mode. Changing the eigenvector to coincide with the initial state induces a head velocity and movement with minimal overshoot or undershoot during the settle mode.

Figure 2:
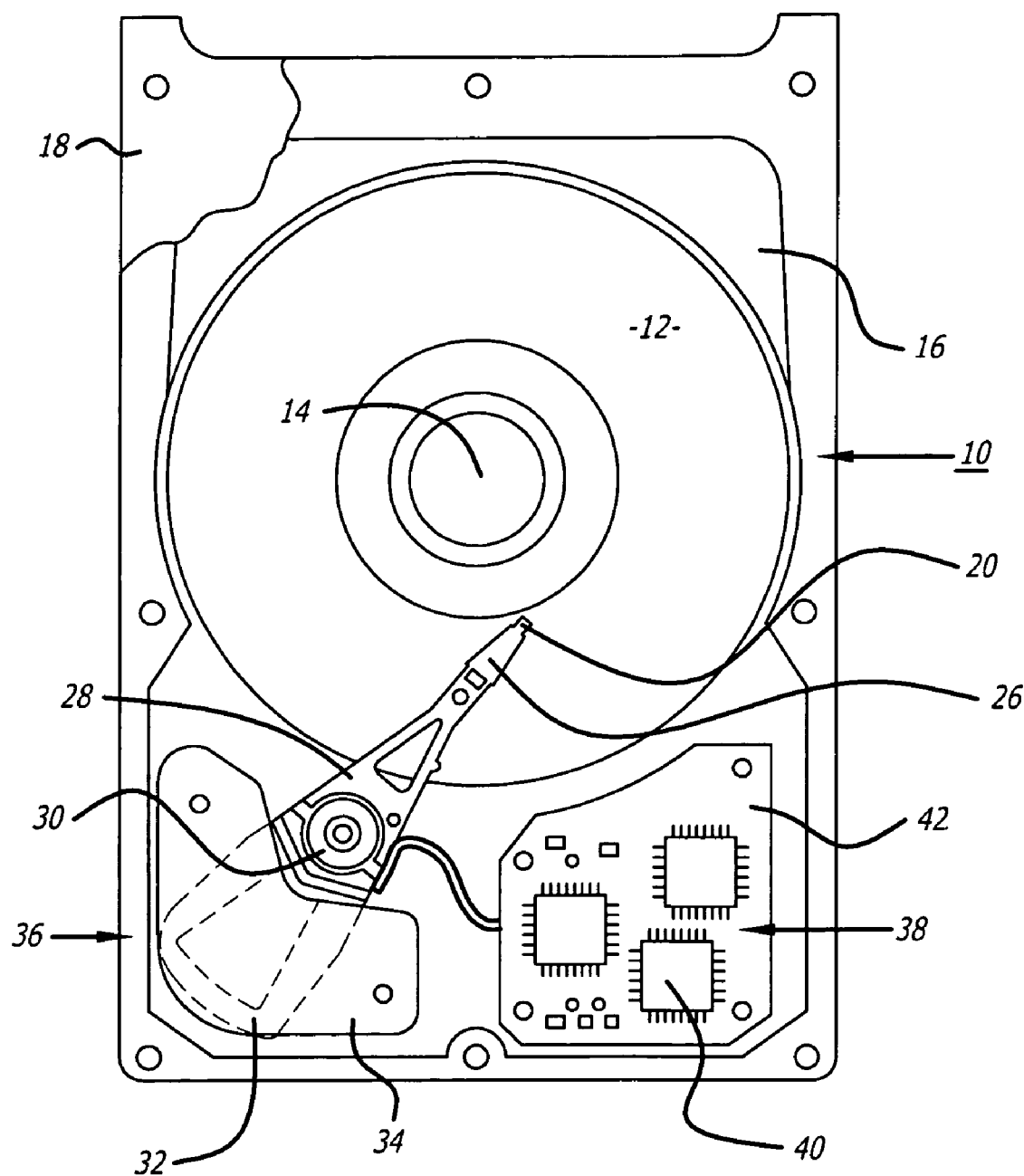
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
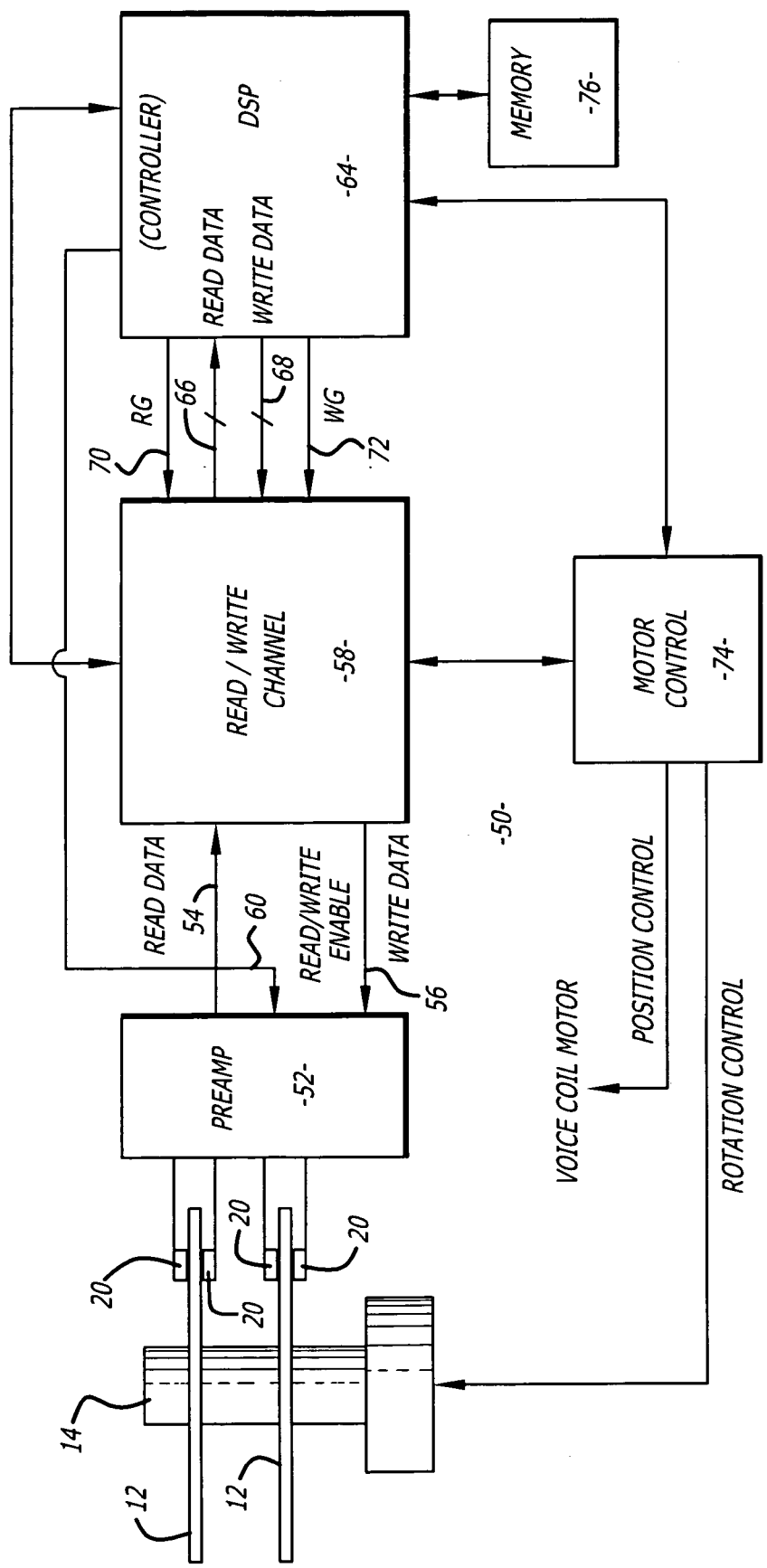
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36, spindle motor 14 and micro-actuator 44 of the disk drive 10. The controller 64 may be connected to a non-volatile memory device 76. By way of example, the device 76 may be a read-only memory ("ROM") that contains instructions that are read by the controller 64.

Figure 1:
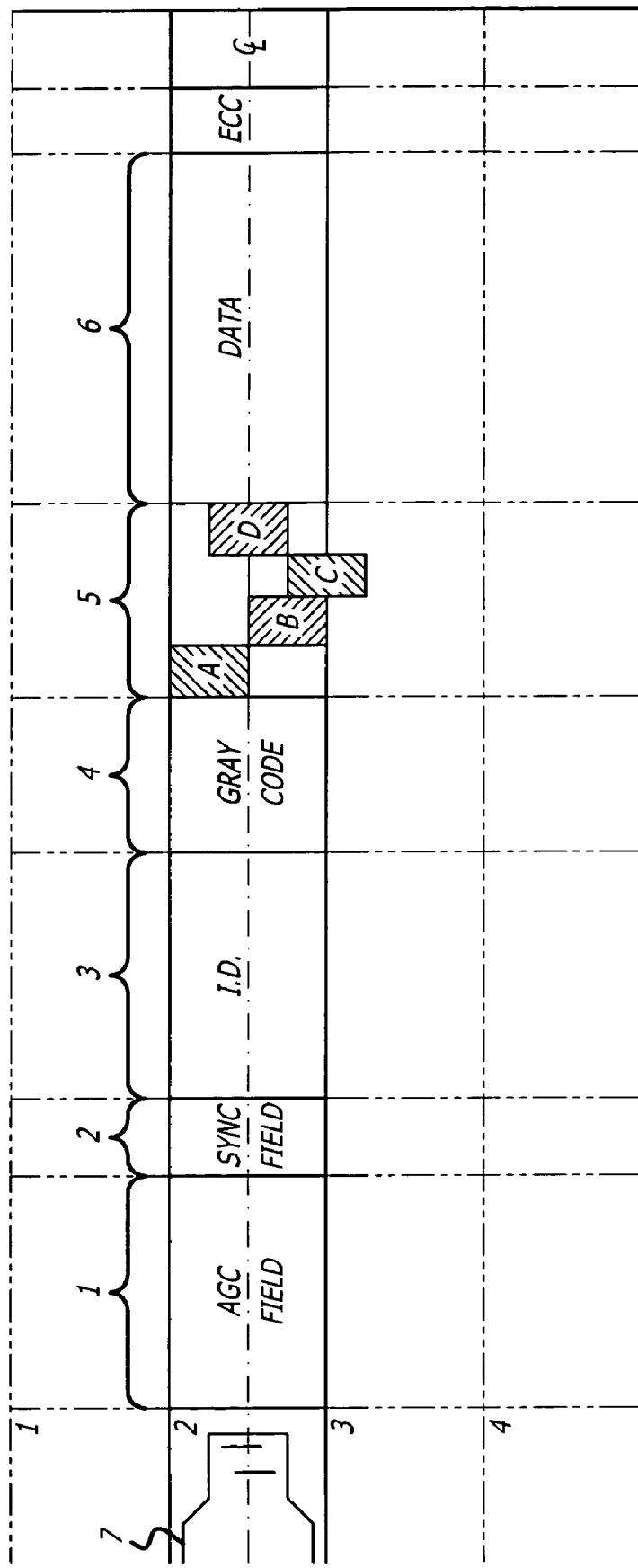
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 4:
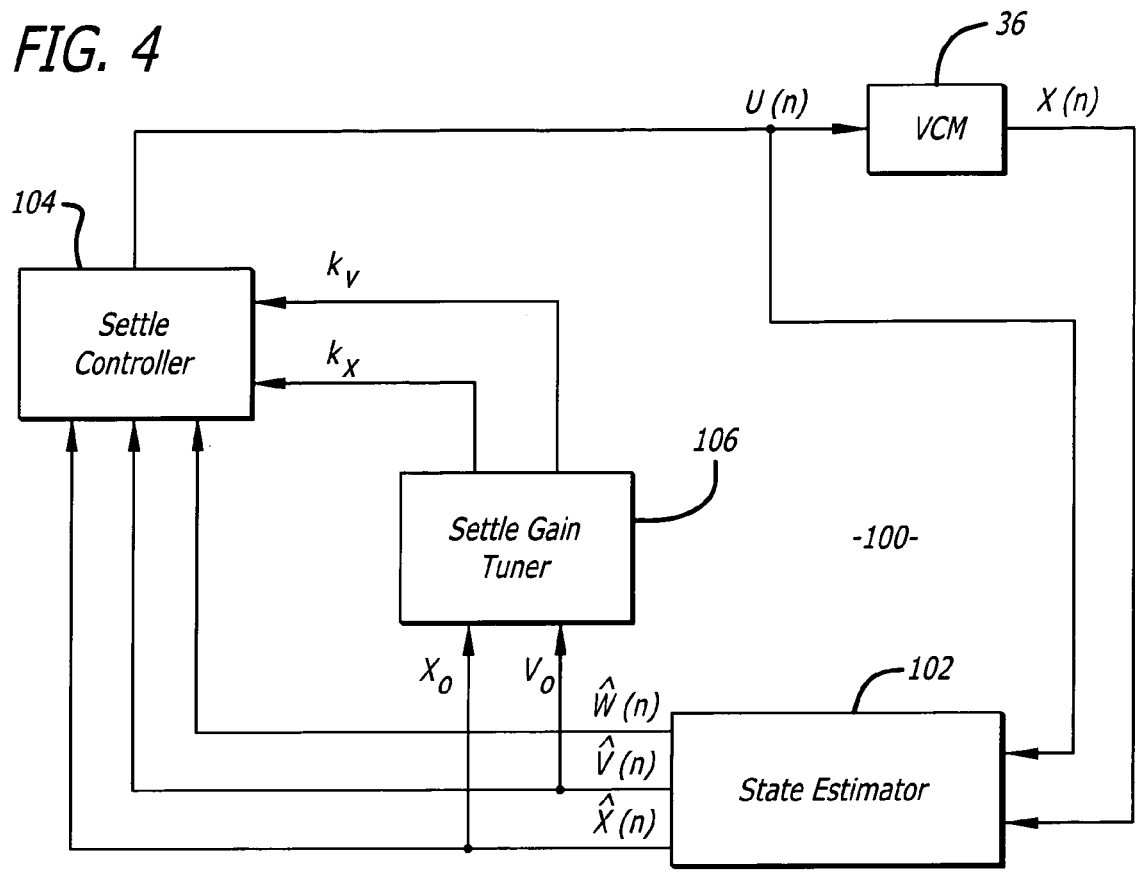
FIG. 4 is a schematic of a control system for the hard disk drive.

FIG. 4 shows a schematic of a control system 100 used to perform a seek operation. The control is typically performed by the controller 64. In a seek operation the heads are moved from one track location to another track location.

A current trajectory u(n) is provided to the voice coil motor 36 to move the heads to the desired track. The system may include a state estimator 102 for feed forward control of the system. The estimator 102 provides position $\hat{x}(t)$, velocity $\hat{v}(t)$ and torque $\hat{w}(t)$ estimates to a settle controller 104 that provides the trajectory u(n).

The settle controller 104 computes the trajectory u(n) in conjunction with a settle velocity gain $k_v$ and a settle position gain $k_x$ provided by a settle gain tuner 106. When the seek routine enters the settle mode the settle gain tuner 106 reads the initial state. The initial state comprises the head velocity $v_0$ and the position of the head $x_0$ when the seek routine initially enters the settle mode.

During the settle mode the system can be described with the following equations:

$$x(n+1) = (A_d - B_d K_f)x(n) \quad (1)$$

$$\begin{bmatrix} x(n+1) \\ v(n+1) \end{bmatrix} = \begin{bmatrix} 1-b_1 k_x & a-b_1 k_v \\ -b_2 k_x & 1-b_2 k_v \end{bmatrix} \begin{bmatrix} x(n) \\ v(n) \end{bmatrix}$$

Where a, $b_1$ and $b_2$ are mechanical parameters. x(n) and v(n) are the position and velocity of the head, respectively, in a present state, and x(n+1) and v(n+1) are the head position and head velocity, respectively, in a next state.

Figure 5:
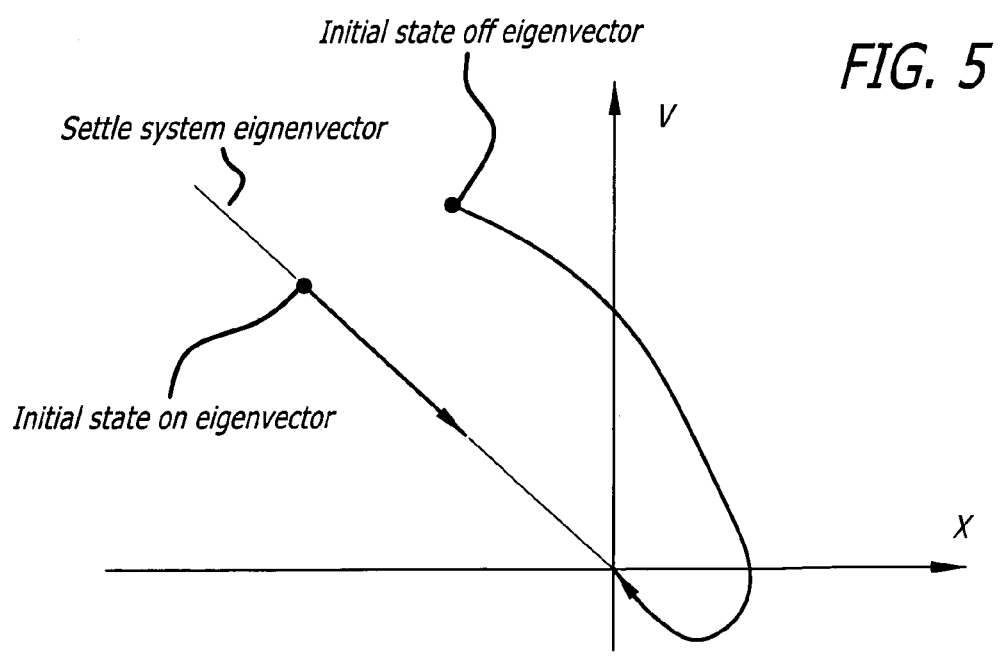
FIG. 5 is a graph showing a velocity versus head position eigenvector.

FIG. 5 shows an eigenvector for head position versus velocity. Ideally the eigenvector should coincide with the initial state when the seek routine enters the settle mode. Because of temperature and other factors the eigenvector may not coincide with the initial state. As shown by the graph an off state eigenvector may cause an overshoot that lengthens the time to properly position the head.

At the start of each settle mode a new eigenvector is computed that coincides with the initial state. The eigenvector can be changed for each settle mode by computing new gain value $k_v$ and $k_x$ with the following equations:

$$\begin{bmatrix} k_x \\ k_v \end{bmatrix} = \frac{1}{b_2 - rb_1} \begin{bmatrix} -r(1-\lambda_2) \\ -ra+(1-\lambda_2) \end{bmatrix} \quad (2)$$

The eigenvalues can be computed from the following equations:

$$b_1 k_x + b_2 k_v - 2 = -(\lambda_1 + \lambda_2)$$

$$(ab_2 - b_1)k_x - b_2 k_v = \lambda_1 \lambda_2 \quad (3)$$

$$r = \frac{v_0}{x_0} < 0 \quad (4)$$

When the seek routine enters a settle mode the settle gain tuner 106 reads the initial state $x_0$ and $v_0$ and computes the gains $k_v$ and $k_x$. The settle controller 104 computes the current trajectory based in part on the new values of gains $k_x$ and $k_v$. The voice coil motor and head are then moved accordingly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm coupled to said head;
   a voice coil motor coupled to said actuator arm; and,
   circuit means for providing a driving current to said voice coil motor to move said head in a seek routine, said seek routine includes a settle mode wherein a settle position gain and a settle velocity gain are computed when said seek routine enters said settle mode.

2. The hard disk drive of claim 1, wherein said settle mode has a velocity versus a head position eigenvector and said eigenvector is changed when said seek routine enters said settle mode.

3. The hard disk drive of claim 2, wherein said settle mode has an initial state and said eigenvector is computed to coincide with said initial state.

4. The hard disk drive of claim 1, wherein said circuit means includes a controller.

5. A hard disk drive, comprising:
   a disk;
   a head coupled to said disk;
   an actuator arm coupled to said head;
   a voice coil motor actuator coupled to said arm; and,
   a circuit coupled to said voice coil motor, said circuit provides a driving current to said voice coil motor to move said head in a seek routine, said seek routine includes a settle mode that has an initial state and a velocity versus head position eigenvector, said eigenvector is computed to coincide with said initial state when said seek routine enters said settle mode.

6. The hard disk drive of claim 5, wherein said circuit includes a controller.

7. A hard disk drive, comprising:
   a disk;
   a head coupled to said disk;
   an actuator arm coupled to said head;
   a voice coil motor coupled to said actuator arm; and,
   circuit means for providing a driving current to said voice coil motor to move said head in a seek routine, said seek routine includes a settle mode that has an initial state and a velocity versus head position eigenvector, said eigenvector is computed to coincide with said initial state when said seek routine enters said settle mode.

8. The hard disk drive of claim 7, wherein said circuit means includes a controller.

9. A method for moving a head across a disk of a hard disk drive, comprising:

moving a head across a disk in a seek routine;
entering a settle mode that has an initial state and a velocity versus head position eigenvector;
computing a new eigenvector so that the eigenvector coincides with the initial state; and,
moving the head to a desired disk position using the new eigenvector.

* * * * *